US012614092B2

(12) United States Patent
Rumade et al.

(10) Patent No.: US 12,614,092 B2
(45) Date of Patent: Apr. 28, 2026

(54) PARAMETERIZED MACHINE LEARNING PIPELINE IMPLEMENTED USING A LAMBDA ARCHITECTURE

(71) Applicant: JP Morgan Chase Bank, N.A., New York, NY (US)

(72) Inventors: Anagha Rumade, Mountainview, CA (US); Sadra Amiri Moghadam, Mission San Jose, CA (US); Abhik Banerjee, Milpitas, CA (US); Gupta Gundlapalli, Frisco, TX (US); Srinivasa Murthy Basavaraju, San Ramon, CA (US)

(73) Assignee: JP Morgan Chase Bank, N.A., New York, NY (US)

( * ) Notice: Subject to any disclaimer, the term of this patent is extended or adjusted under 35 U.S.C. 154(b) by 206 days.

(21) Appl. No.: 18/360,778

(22) Filed: Jul. 27, 2023

(65) Prior Publication Data
US 2025/0036396 A1      Jan. 30, 2025

(51) Int. Cl.
| | |
|---|---|
| *G06F 8/70* | (2018.01) |
| *G06F 3/06* | (2006.01) |
| *G06F 8/34* | (2018.01) |
| *G06F 8/60* | (2018.01) |
| *G06F 8/77* | (2018.01) |
| *G06N 5/04* | (2023.01) |

(Continued)

(52) U.S. Cl.
CPC .............. *G06N 5/04* (2013.01); *G06F 3/067* (2013.01); *G06F 8/34* (2013.01); *G06F 8/60* (2013.01); *G06F 8/70* (2013.01); *G06F 8/77* (2013.01); *G06F 9/4411* (2013.01); *G06N 20/00* (2019.01); *H04L 63/1425* (2013.01)

(58) Field of Classification Search
CPC ...... G06N 20/00; G06N 5/04; H04L 63/1425; G06F 8/60; G06F 8/77; G06F 3/067; G06F 9/4411; G05B 19/41885
See application file for complete search history.

(56) References Cited

U.S. PATENT DOCUMENTS

| | | | |
|---|---|---|---|
| 12,182,680 B1 * | 12/2024 | Wolf ......................... | G06N 5/04 |
| 2018/0191867 A1 * | 7/2018 | Siebel ....................... | G06F 8/77 |

(Continued)

*Primary Examiner* — Tuan A Vu
(74) *Attorney, Agent, or Firm* — Wood IP, LLC; Theodore A. Wood

(57) ABSTRACT

A method for developing and deploying a machine learning pipeline is provided. The method may be implemented by at least one processor. The method may include collecting different types of data from one or more data sources, wherein the different types of data includes batch data and real-time data; continuously processing the data to build a plurality of layers of a Lambda application, wherein each layer is configured to be deployed independently of the other layers; building a modular machine learning pipeline in a modifiable reference file, wherein the modular machine learning pipeline defines a framework comprising a no-code/low-code parameterized machine learning framework; deploying the modular machine learning pipeline as a single deployment machine learning pipeline that can be modified for different use cases by revising the source code of a CI/CD (Continuous Integration and Continuous Delivery/Continuous Deployment) pipeline, while the framework of the machine learning pipeline remains unchanged.

20 Claims, 7 Drawing Sheets

(51) Int. Cl.
    *G06F 9/4401*        (2018.01)
    *G06N 20/00*        (2019.01)
    *H04L 9/40*         (2022.01)

(56)            References Cited

U.S. PATENT DOCUMENTS

| | | | |
|---|---|---|---|
| 2020/0387357 A1* | 12/2020 | Mathon | G06F 9/4411 |
| 2021/0241088 A1* | 8/2021 | Fong | G06N 20/00 |
| 2021/0390455 A1* | 12/2021 | Schierz | G06N 20/00 |
| 2022/0035541 A1* | 2/2022 | Genereux | G06F 3/067 |
| 2022/0309407 A1* | 9/2022 | Ramirez | G06F 8/60 |
| 2023/0297089 A1* | 9/2023 | Jin | G05B 19/41885 |
| | | | 700/97 |
| 2024/0007492 A1* | 1/2024 | Shen | H04L 63/1425 |

\* cited by examiner

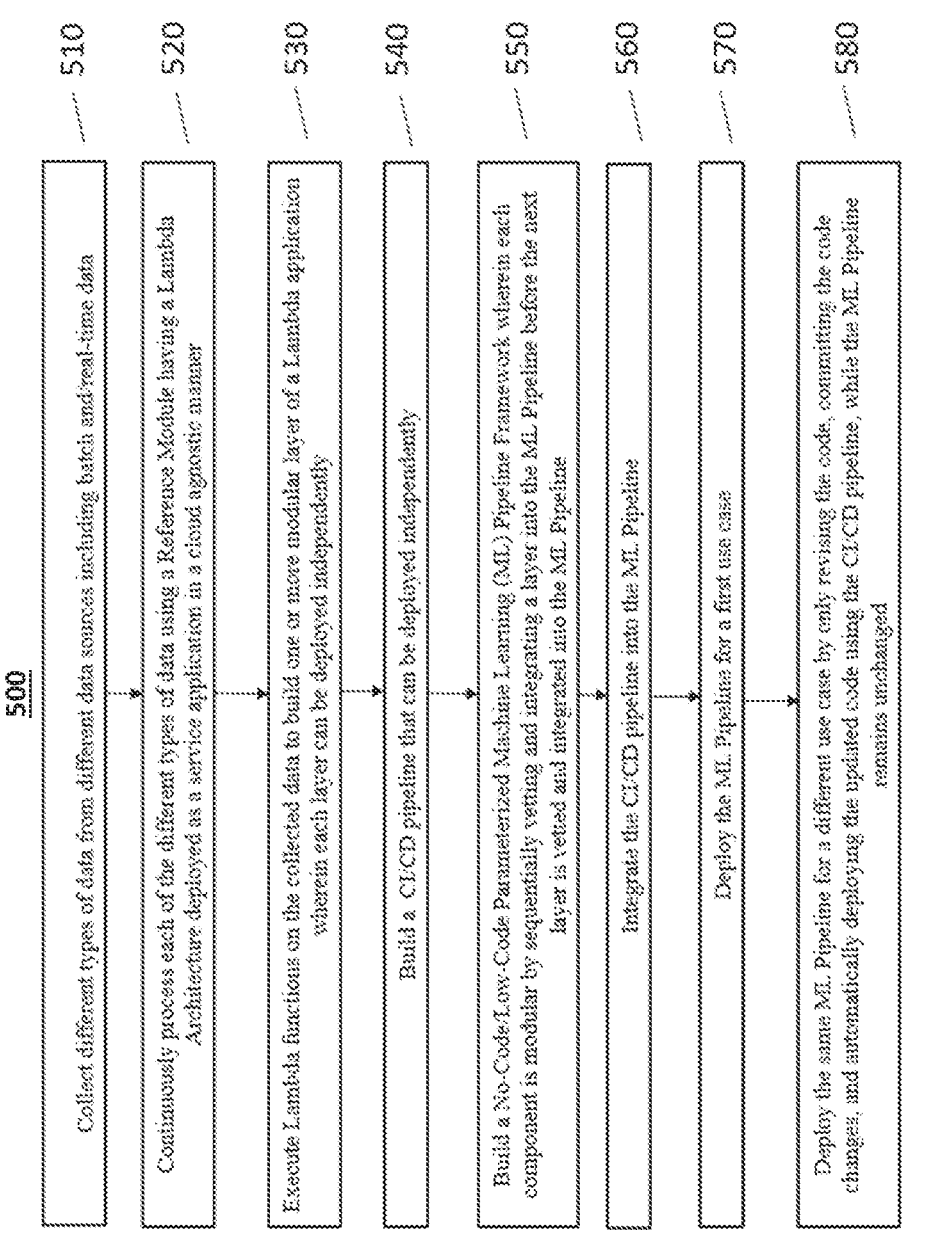

500

510 — Collect different types of data from different data sources including batch and real-time data 520 — Continuously process each of the different types of data using a Reference Module having a Lambda Architecture deployed as a service application in a cloud agnostic manner 530 — Execute Lambda functions on the collected data to build one or more modular layer of a Lambda application wherein each layer can be deployed independently 540 — Build a CI/CD pipeline that can be deployed independently 550 — Build a No-Code/Low-Code Parameterized Machine Learning (ML) Pipeline Framework wherein each component is modular by sequentially vetting and integrating a layer into the ML Pipeline before the next layer is vetted and integrated into the ML Pipeline 560 — Integrate the CI/CD pipeline into the ML Pipeline 570 — Deploy the ML Pipeline for a first use case 580 — Deploy the same ML Pipeline for a different use case by only revising the code, committing the code changes, and automatically deploying the updated code using the CI/CD pipeline, while the ML Pipeline remains unchanged

FIG. 5

PARAMETERIZED MACHINE LEARNING PIPELINE IMPLEMENTED USING A LAMBDA ARCHITECTURE

FIELD OF TECHNOLOGY

The present disclosure relates generally to machine learning and, in particular, to the use of computing platforms for the development and deployment of parameterized machine learning (ML) pipelines using a Lambda architecture.

BACKGROUND

ML is a branch of artificial intelligence (AI) that enables computers to "learn"—that is, to analyze a large data set to identify patterns and make predictions, all without being explicitly programmed to do so. ML refers to a system's ability to acquire, and integrate knowledge through large-scale observations, and to improve, and extend itself by learning new knowledge rather than by being programmed with that knowledge.

The logic of ML is automatically created by continuously learning from data. As such, the development process of traditional ML pipeline systems involves a complex set of different activities, including data collection, feature engineering. These activities also include storing features in a feature store, model training, and inference serving that are performed by many people from different fields, such as data science, statistics, and mathematics.

In many situations, the accurate implementation of ML algorithms requires a set of skills and expertise of many people whose skills and expertise are focused in other areas. This raises technical challenges that can increase the time necessary to build an ML application and increases the likelihood that a given ML tool will reflect a less-optimal ML algorithm. Such technical challenges are often compounded in situations where an ML tool is intended to be used in complex development operations where multiple teams may interact with the ML tool.

For instance, in large companies, multiple people may play different roles (ML expert, software engineer, AI architect) in the development and maintenance of the ML-based systems. The designers are from different backgrounds and will need to effectively collaborate and work together to handle a variety of tasks to keep the ML pipeline running smoothly. Maintaining the software code has become challenging, because the software applications are too complex and consist of millions of code written in diverse programming languages and backed by hundreds of business rules. Ensuring end to end pipeline reliability, version control and rollback mechanisms further add to the complexity of the ML pipeline deployments. Therefore, developing, deploying, and maintaining large scale ML based software systems is challenging.

As such, a need exists for systems and methods that accommodate variance in skill-levels across developers and that can be adapted to each customer's situational need.

SUMMARY

The present disclosure, through one or more of its various aspects, embodiments, and/or specific features or sub-components, provides, inter alia, various systems, servers, devices, methods, media, programs, and platforms for auto-matically building and implementing parameterized ML pipelines using a Lambda architecture.

In various embodiments, a system and method provide a no-code/low-code parametrized ML framework where each components in the ML framework is modular and can be deployed independently to expedite its implementation across multiple use cases.

In embodiments, a user can operate the system and method without having specific knowledge of any particular software component. The system and method operate in terms of an abstract functional model that generalizes the tasks performed so as to be independent of any software component. This generalizes the ML framework and reduces multiple deployments across multiple use cases.

In an embodiment, a method for developing and deploying an ML pipeline is provided. The method may be implemented by at least one processor. The method may include collecting different types of data from one or more data sources, wherein the different types of data includes batch data and real-time data; continuously processing the data to build a plurality of layers of a Lambda application, wherein each layer is configured to be deployed independently of the other layers; building a modular ML pipeline in a modifiable reference file, wherein the modular ML pipeline defines a framework comprising a no-code/low-code parameterized ML framework; deploying the modular ML pipeline as a single deployment ML pipeline that can be modified for different use cases by revising the source code of a CI/CD (Continuous Integration and Continuous Delivery/Continuous Deployment) pipeline, while the framework of the ML pipeline remains unchanged.

In embodiments, the framework comprises modular components configured to be deployed independently of each other. The Lambda application comprises a plurality of layers including a batch layer, a real-time layer, and an inference layer. A modular machine pipeline can be built by sequentially vetting and integrating a first layer of the plurality of layers into the modular ML pipeline before the next layer is vetted and integrated into the modular ML pipeline.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 5 is a flowchart of an exemplary process for implementing a method for developing and deploying a modular ML pipeline, according to an exemplary embodiment.

DETAILED DESCRIPTION

Figure 1:
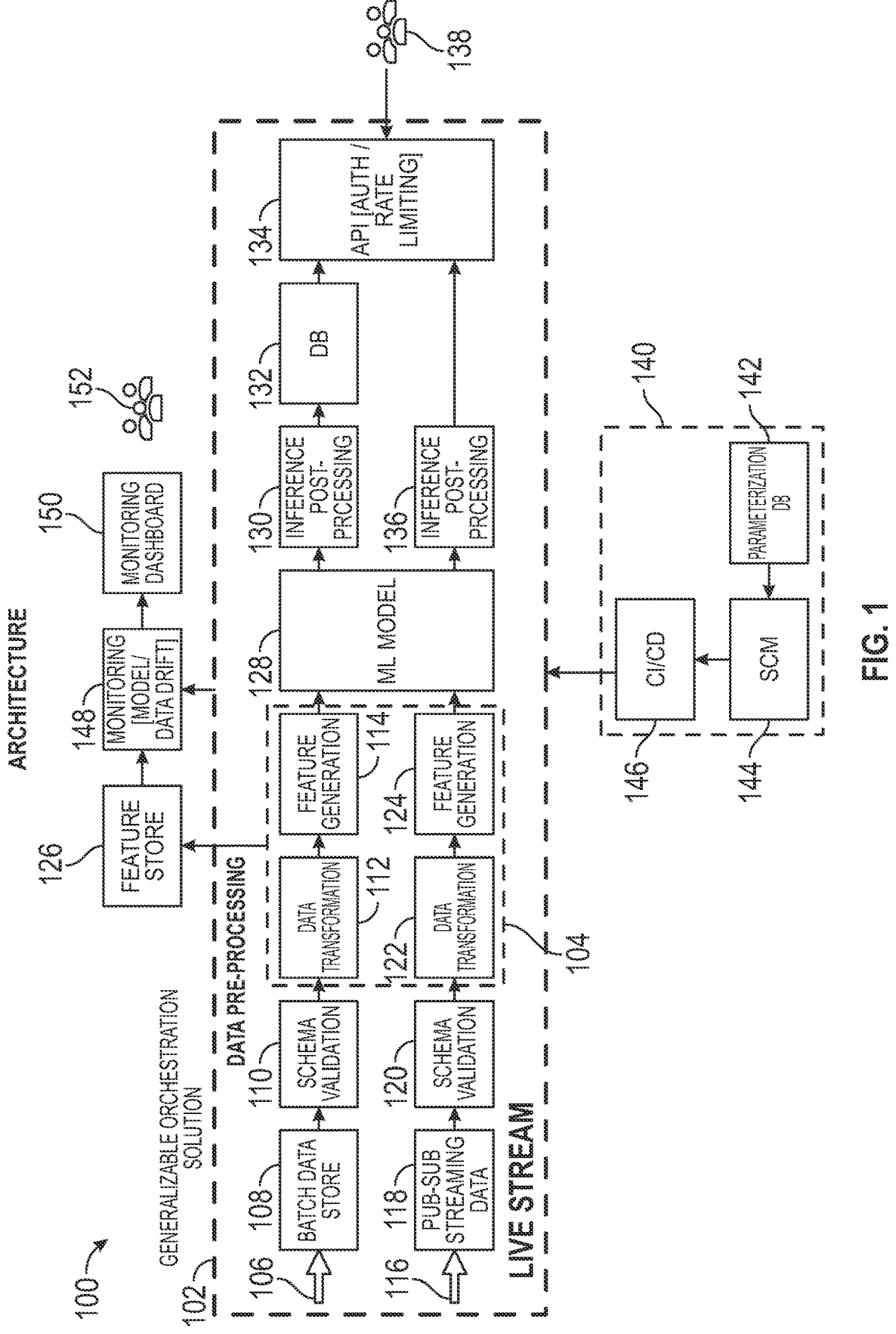
FIG. 1 shows an exemplary system for implementing a method for automatically building and deploying parameterized ML pipelines using a Lambda architecture, according to an exemplary embodiment.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As described herein, various embodiments provide optimized methods and systems for automatically building and deploying parameterized ML pipelines using a Lambda architecture.

In various embodiments, a system and method provide a no code/low code parametrized ML framework where each components in an ML framework is modular and can be deployed independently to expedite its implementation across multiple use cases. A user can operate the system and method without having specific knowledge of any particular software component. The system and method operate in terms of an abstract functional model that generalizes the tasks performed so as to be independent of any software component. This generalizes the ML framework and reduces multiple deployments across multiple use cases.

In an embodiment, the computing platform provides a modular architecture that can be leveraged across multiple use cases. The workflow can be divided into multiple modular stages that can each be deployed, upgraded and optimized independently. In contrast, building a traditional ML pipeline is a strenuous task, because the whole pipeline is often built sequentially.

In a basic ML architecture, the various stages include mainly data pre-processing, model training, model evaluation, and model deployment. Data pre-processing entails collecting raw, unprocessed data. The pipeline transforms the raw data into useful information, which is in a format that can be understood. Data pre-processing techniques include feature engineering, feature extraction, feature selection, and storing features in a feature store. The result of data pre-processing is the data that is utilized for training and testing the model. The model can only be as good as the data that is used to train it.

Model training is the process in which an ML algorithm is fed with training data from which it can learn. ML models can be trained to benefit businesses in numerous ways, by quickly processing huge volumes of data, identifying patterns, and finding anomalies or testing correlations that would be difficult for a human to do unaided.

Model evaluation is performed after the candidate model(s) is trained. The candidate model is evaluated based on historical data to confirm that they are performing as expected and to determine which candidate model will perform the best in the next stage, which is model deployment.

Model deployment, which is the final stage, is the process of implementing a fully functioning ML model into an existing production environment. In this environment, it can make predictions based on data. Users, developers, and systems then use these predictions to make practical business decisions.

Various embodiments described herein are directed to parameterized ML implemented via a Lambda application. The Lambda architecture is used to quickly access real-time data for querying. In the present disclosure, the Lambda architecture can consist of three layers, for example: batch processing, real-time (or speed) processing, and inference processing. Data is fed into the system continuously from a variety of sources.

The Lambda architecture provides a creative way to access real-time and near real-time data. New data is fed into the batch, real-time and inference layers independently or simultaneously. In the context of the various embodiments described herein, a Lambda application utilizes a Lambda data processing architecture such that data may be addressed via both batch processing and real-time processing (i.e., stream processing or speed processing). After the ML model is built and trained, the inference layer can be used to make predictions, also known as "inference".

Various embodiments are directed to building a generalizable ML pipeline that caters to both batch and real time data and ML pipelines. According to the present disclosure, the automated ML pipeline is end-to-end, starting with the model's initial development and training and ending with its final deployment. Specifically, the ML pipeline encompasses all the different steps in a typical ML operations pipeline, all the way from feature engineering, storing features in a feature store, model development, model evaluation, model deployment—batch and real time, and model monitoring.

Typically, in building an end-to-end ML pipeline, building an ML model is approximately only 5-10% of the effort, while most of the effort is consumed by the ML multiple deployments, maintenance of ML model governance and maintenance of the model metadata management. The system and method provide a solution to this problem wherein only a single deployment is required and updating of the code after the deployment is easily facilitated.

In embodiments, the present disclosure provides a no-code/low-code parametrized ML framework where each of these components in the ML framework is modular and can be deployed independently to expedite this across multiple use cases. As used herein, the terms "no-code" and "low-code" generally refer to software development platforms and/or tools that are targeted at users with little or no development experience (e.g., also referred to as citizen developers, or no-code/low-code developers). Here, no-code can refer to development with no coding experience, while low-code can refer to development requiring some level of coding experience.

Various embodiments encompass parametrizing the ML framework such that it can be applied to any application with no-code/low-code. A system implementing the no-coding/low-coding ML pipeline employing a Lambda architecture described in this specification provides users that cannot code, or do not want to code, the possibility to quickly and easily generate, execute and publish ML models. In addition, users of the no-coding/low-coding ML pipeline do not need an understanding of basic or complex ML concepts.

The presently described no-coding/low-coding ML pipeline is therefore accessible to a larger number of users. Additionally, it improves interactions between users and the pipeline, since even inexperienced users can generate and run ML solutions quickly and with minimal effort. While the present disclosure references no-code developers and/or low-code developers, it is appreciated that implementations of the present disclosure can be realized for the benefit of more sophisticated developers.

In embodiments, the ML deployment can be configured to operate as a Lambda architecture where the schema validation (data validation), model training, model retraining can happen as both batch and real time methods. Both the batch and real time model deployment are flexible and generalizable which can be deployed once and then used for multiple applications, which reduces the need for multiple deployments for each of these steps. A goal of the ML framework is to reduce the number of deployments by making the deployment components more modular, transferable at the same time, which helps the multiple stages of the processes to capture the correct metadata at every stage in the process.

Referring to FIG. 1, a schematic of an exemplary architecture of system 100 implementing a method for automatically building and deploying parameterized ML pipelines using a Lambda architecture. In an exemplary embodiment, the method is executable on any networked computer platform, such as, for example, a personal computer (PC). One of the advantages is that the system and methods of the present disclosure encompasses parametrizing the ML framework such that it can be applied to any application with no/low code. Example components, such as the schema validation (data validation), feature drift, model drift, etc. are a part of the no-code/low-code framework.

As shown in FIG. 1, the system 100 includes an ML pipeline that comprises a generalizable orchestration solution 102. The generalizable orchestration solution 102 is used to tie together a number of independent automation processes into a cohesive and unified system for effective and secure infrastructure management. The generalizable orchestration solution 102 includes a data pre-processing stage 104. The data pre-processing stage 104 entails collecting raw, unprocessed data. The pipeline transforms the raw data into useful information, which is in a format that can be understood. Data pre-processing techniques include feature engineering, feature extraction, feature selection, and storing features in a feature store.

The result of data pre-processing is the data that is utilized for training and testing an ML model 128. One of the benefits of the modular architecture is that it helps the multiple stages of the processes to capture the correct metadata at every stage in the process. This is important because the model can only be as good as the features extracted and selected which are used to train the model.

FIG. 1 shows the data flow through the system 100. The data can be any type data from strings to complex objects representing text, video, sensor data, audio or other digital content. The data pre-processing stage 104 includes a batch layer 106 and a real-time layer 116. The batch layer 106 can handle very large quantities of data. Therefore, in the batch layer 106, the model training can be implemented on a larger data set, which provides better model accuracy numbers. In real time layer 116, the model parameters for the model training are fit lightly, and may produce approximate accuracy results.

The batch layer 106 includes a batch data store 108, a schema validation 110, data transformation 112, and feature generation 114. The batch store 106 is configured to store incoming batch data from various sources that are archived for historical analytics purpose. In one example, the batch data store 106 may be configured to store data records corresponding to several hundred thousand user sessions. For example, the batch data store 106 can serve arbitrarily huge datasets with high query per second rate. For example, in some embodiments, batch data stores with full structured query language (SQL) query, Graph query, GIS query are supported.

The data from the batch data store 106 may be written to the schema validation 110. The schema or metadata validation 110 is configured to execute a validation process of the data, where the data may be checked for invalidity. A metadata schema establishes and defines data elements and the rules governing the use of data elements to describe a resource. Schema or metadata validation rules can be created to ensure that all data share a similar structure. Schema validation 110 defines which data are valid based on several predefined properties. The metadata makes it easier to find the relevant data. Schema validation 110 allows the system 100 to check if incoming data traffic complies with a predefined schema.

In FIG. 1, the automated feature engineering broadly involves the data transformation 112 and the feature generation 114. The feature engineering according to the present disclosure can also encompass some additional steps, including feature extraction, feature transformation, feature selection, and feature analysis and evaluation.

Feature engineering is the process of selecting, interpreting, and transforming structured or unstructured raw data into attributes ("features") that can be used to build effective ML models which more accurately represent the underlying problem. In this context, a "feature" refers to any quantifiable, measurable data that may be used in a predictive model, such as name, age or gender.

Feature engineering is a significant step before building a precise ML model 128. Feature engineering selects and transforms the most relevant variables from raw data to create input features to ML models for inferencing. The goal of feature engineering is to find the best features that are useful for ML models.

In FIG. 1, the feature engineering also transforms unprocessed data into features that better address the core problem with ML models, resulting in increased model accuracy on previously unknown data. When the data is transferred from the schema validation 110 to the data transformation 112, the data is in its raw original form which is not usable. The data transformation 112 is the process of converting, cleaning, and structuring the raw data into a usable format. Data transformation can be used when data needs to be converted to match that of the destination system.

Feature generation 114 involves ingesting raw data, filtering and aggregating it to extract vital data sets, and then transforming the features into the desired format. Feature generation 114 is the process of creating new variables from a data set automatically by extracting the vital data sets without losing any significant information present in the original raw data. The aim of this phase is to reduce the amount of raw input data into manageable quantities that can be processed by an algorithm in a reasonable time.

Within the feature engineering, feature selection is the process of selectively choosing a subset out of the original set of features to reduce the complexity of predictive models. The feature selection technique includes choosing a specific set of variables that are appropriate for subsequent analysis. The goal is to derive the smallest set of features that best represent the data characteristics. This increases the computational efficiency of the model and makes it less vulnerable to generalization or noise errors that might occur due to the presence of irrelevant features. Optionally, a feature transformation phase may be included wherein features are modified or represented in such a way as to optimize ML algorithms. The feature transformation creates new features from existing ones. The goal here is to modify, plot or visualize data in a way that makes more sense, speeds up the algorithm, or makes a model more accurate.

In the embodiments, the feature engineering process can select high-quality features that allow the system 100 to build models 128 that are faster, more flexible, and easier to maintain. Feature engineering is a critical component of ML models because the accuracy of the ML model 128 directly depends upon the selected features. The feature engineering process creates, analyzes, refines, and selects the predictor variables that will be most useful to the ML model 128. During the feature engineering process, the goal is to create and select features or variables that will achieve the most accurate ML model.

In FIG. 1, in addition to receiving the batch data at the batch layer 106, the system 100 also intermittently (e.g., periodically or continuously) receives real-time data from various data sources at the real-time layer 116. As the data is intermittently received, the system 100 can receive the data into a single data stream 118. In an example, the data stream may be a pub-sub (publish-subscribe) data stream 118. In this example, as the data records from the real-time data streams continue to be intermittently received at the real-time layer 116, the pub-sub data stream 118 transmits the data records to the schema validation 120.

As described above, the schema validation 120 includes rules for checking the validity of the data. Schema validation rules can be created to ensure that all data share a similar structure. Schema validation 120 defines which data are valid based on several predefined properties. Schema validation 120 allows the system 100 to check if incoming data traffic complies with a predefined schema. From the schema validation 120, the real-time data then follows a path through the data transformation 122 and feature generation 126 and undergoes a similar process as described above with respect to the data transformation 112 and feature generation 116, respectively.

A feature store 126 is coupled to the data pre-processing stage 104. Accordingly, the features extracted from the batch data during the data transformation 112 and the feature generation 114, and extracted from the real-time data during the data transformation 122 and the feature generation 124 can be stored in the feature store 126. Therefore, the feature store 126 can act as a central repository for all the different features which have been created to be used for data analysis and machine learning.

In FIG. 1, the data pre-processing stage 104 is coupled via the feature generation 114 and the feature generation 124 to the ML model 128. After the features are determined in the data pre-processing stage 104, the next step is to train the ML model 128. The result of data pre-processing 104 is the data that is utilized for training and testing the ML model 128. Model training is the process in which an ML algorithm is fed with training data from which it can learn. This step is iterative, where multiple algorithms are tried to obtain a trained model. The ML model 128 can be trained to benefit businesses in numerous ways, by quickly processing huge volumes of data, identifying patterns, finding anomalies or testing correlations that would be difficult for a human to do unaided.

In the ML model 128 phase, model evaluation is performed after the candidate model(s) is trained. The trained model is tested using specific predefined criteria on the test set, and if the performance is acceptable, the model is ready for deployment. The candidate model is evaluated on historical data to confirm that they are performing as expected and to determine which candidate model will perform the best in the next stage, which is the model deployment.

After the ML model 128 is built and trained, the inference post-processing 130, 136 can be used to make predictions, also known as "inference", based on the data to produce actionable results. The inference post-processing 130, 136 occurs during the deployment phase of the ML model pipeline, after the model has been successfully trained. The ML inference post-processing 130, 136 is the process of deploying the ML model to a production environment to infer a result from the input data. The inference post-processing 130, 136 can be used in a wide variety of industries for various use cases. One example is training an autonomous vehicle to obey traffic rules and laws.

First, the vehicle's system needs to know the traffic rules. As such, the vehicle's system would be trained on datasets that can help it learn to recognize traffic occurrences that the vehicle should anticipate, such as traffic signs, stoplights, and pedestrians, among other things. The vehicle's system memorizes the rules of the road by reviewing examples and learning to analyze what actions it should take when it observes certain traffic signs or scenarios. When driving on the road, the autonomous vehicle needs to make inferences based on its surroundings to determine the correct actions to take.

After predictions are generated by the ML model in the inference post-processing 130, 136, the predictions are sent to the data destination. The data destination is the target of the ML model 128. The data destination can be any type of data repository, such as a database or a stream processing system that feeds downstream applications. For example, the data destination for the inference post-processing 130 can be a database 132 of a web application, which stores the predictions and allows them to be viewed and queried by end users 138 by accessing an Application Programming Interface (API). The data destination for the inference post-processing 136 can be a stream processing system that feeds downstream applications to API 134.

In the embodiments, there are different techniques in which the trained model can be deployed. For example, two techniques are "Model as a Service" and "Embedded model." In "Model as a Service", the model may be exposed as an API endpoint 134. That is, the model is deployed on a web server so that it can interact through the API 134 and any application can obtain predictions by transferring the input data through an API. The web server can run locally or in the cloud. For example, with a few lines of code, the model can be converted into a production representational state transfer (REST) API endpoint, which offers a unified model packaging format. It functions as a wrapper around the ML model 128 for converting it into a prediction service. In the "Embedded model", the model is packaged into an application, which is then published.

In FIG. 1, the system and method can employ a CI/CD pipeline 140 to improve the software code development and deployment. One advantage of the embodiments is that if there are changes to the parameters of the source code after deployment, only the CI/CD pipeline 140 needs to be changed and updated to adapt to the new parameters. At the same time, the ML pipeline 102 remains unchanged. Therefore, the same ML pipeline 102 can be used across various use cases by merely making changes to the code in the CI/CD pipeline 140. Thus, this feature enables a single deployment. In contrast, traditional systems require multiple redeployments, which is time consuming and prone to delays and errors.

The CI/CD pipeline 140 can be configured to consist of a series of automated processes that enable software teams to build and deploy a new version of code smoothly into the generalizable orchestration solution 102. The CI/CD pipeline 140 facilitates an effective process for continuously delivering code into the generalizable orchestration solution 102 and ensures an ongoing flow of new features and bug fixes via the most efficient delivery method. The software code may be, without any limitation, a mobile application and/or a web application.

The CI/CD pipeline 140 may include a parameterization database 142, a source control management (SCM) system 144, and a CI/CD tool 146. In the CI/CD pipeline 140 new code is submitted on one end (at parameterization database 142) and the new code gets tested through phases such as sourcing, building, staging, and production, and then finally released as a ready-for-production code at CI/CD tool 146. In the CI/CD pipeline 140, each stage serves as a gate that verifies a specific feature of the code. The premise is that as the code travels through pipeline 140, its quality will improve since it is automatically checked, or manually checked by developers.

The CI/CD pipeline 140 can include some of the following stages: build stage, test stage, release stage, and deployment stage. The build stage is when the code is retrieved from various internal and external sources, including code repositories. The test stage is when the code is examined for defects. The release stage is when an application is posted to a repository and is ready for deployment. The deployment stage is when an application is staged in an internal environment and undergoes additional quality assurance (QA) and testing prior to deployment into production. Next, the existing version of the application is replaced, and the new version is put into production for end-users.

In FIG. 1, to begin building the CD/CI pipeline 140, parameterization is used to set the values of various parameters to create the code or change the parameters of an existing source code. Within a computer program, the parameterization process can take values or objects defined within a function or a method, and make them parameters to that function or method, to generalize the code. Thus, the system identifies the items to be parameterized and facilitates creating code that stores information associated with the parameterized items. The Parameterization database 142 stores the defined parameterized code.

Data files of the parameterized code may be received by a SCM system 144. The SCM system 144 keeps track of all the changes made to the software code. The SCM system 144 provides a running history of code development and helps to resolve conflicts when merging contributions from multiple sources. The SCM system 144 also provides for revision control, where changes to the code are tracked and controlled. The SCM system 144 allows teams to collaborate on the code, isolate each team member's work until it is ready, and quickly troubleshoot issues by identifying which team member made the changes and what changes were made.

At the SCM system 144, developers can commit their code changes and consolidate the code in a repository. The CI/CD tool 146 may receive the code changes from the SCM system 144. The CI/CD tool 146 can be configured to build or compile the source code changes to package it into an executable application. The source code changes can be tested during or after the building. The CI/CD tool 146 may automatically deploy the source code changes into the production of the ML model 128, either immediately or after a specified period of time. This permits continuously delivering the source code changes into the generalizable orchestration solution 102 to ensure an ongoing flow of new features and bug fixes to the system. The CI/CD tool 146 can be configured to deliver the updated source code changes at various locations, such as the data pre-processing and/or the post-processing stage.

Additionally, a monitoring system 148 may be employed to continuously monitor and evaluate the performance of a model to ensure a fast feedback loop for solving bugs and other problems that may be encountered in ML model 128 production. As patterns in the incoming data change dramatically over time, the ML model 128 may not be able to perform as expected (referred to as model staleness) and must be re-trained. Therefore, closely monitoring the model's performance helps prevent decreasing effectiveness of the ML model.

Various problems may need to be evaluated before and during deployment for production. For example, the performance of the model deployed might degrade with time due to specific phenomenon such as drift (e.g., model drift and data drift). Model drift (also known as concept drift) is a major source of model performance degradation. Model drift occurs when the task that the model was designed to perform changes over time. It represents when the pattern that the model has learned in the past is no longer valid. Data drift (also known as feature drift or covariate drift) occurs when the distribution of the input data changes over time. For data drift, the monitoring system 148 checks whether the input data's statistical structure has changed over time.

Such drift may require the already deployed model to be retrained on newer incoming data or deployment of a completely new model in production. Once a fault is found by the monitoring system 148, an action policy may be implemented. The action policy decides what changes should occur based on the alerts generated by the monitoring system 148. A deployed model is tracked on a frequent, regular basis by the monitoring system 148. Anomalies due to model and data drift would become apparent in the model's inference quality. One-off variation of inference due to data outliers is not an issue. However, gradual degradation of inference quality is closely monitored, and relevant alerts and notifications are displayed on the ML model monitoring dashboard and will also act as a trigger for model retraining on recent dataset.

In some embodiments, the monitoring system 148 may access the historical data and provide a view of past performance and activity for a portfolio of models. A monitoring dashboard 150 may be provided allowing users 152 to view various metrics and information about the portfolio of models. In some cases, the monitoring system 148 may allow users to monitor models via a Graphical User Interface (GUI). To perform drift detection, the monitoring system 148 may be configured to register a model with the monitoring system, associate that model with a particular training dataset, automatically map the underlying features, and then register ongoing inferences by the model against the training dataset to understand deviations from the training data set.

Figure 2:
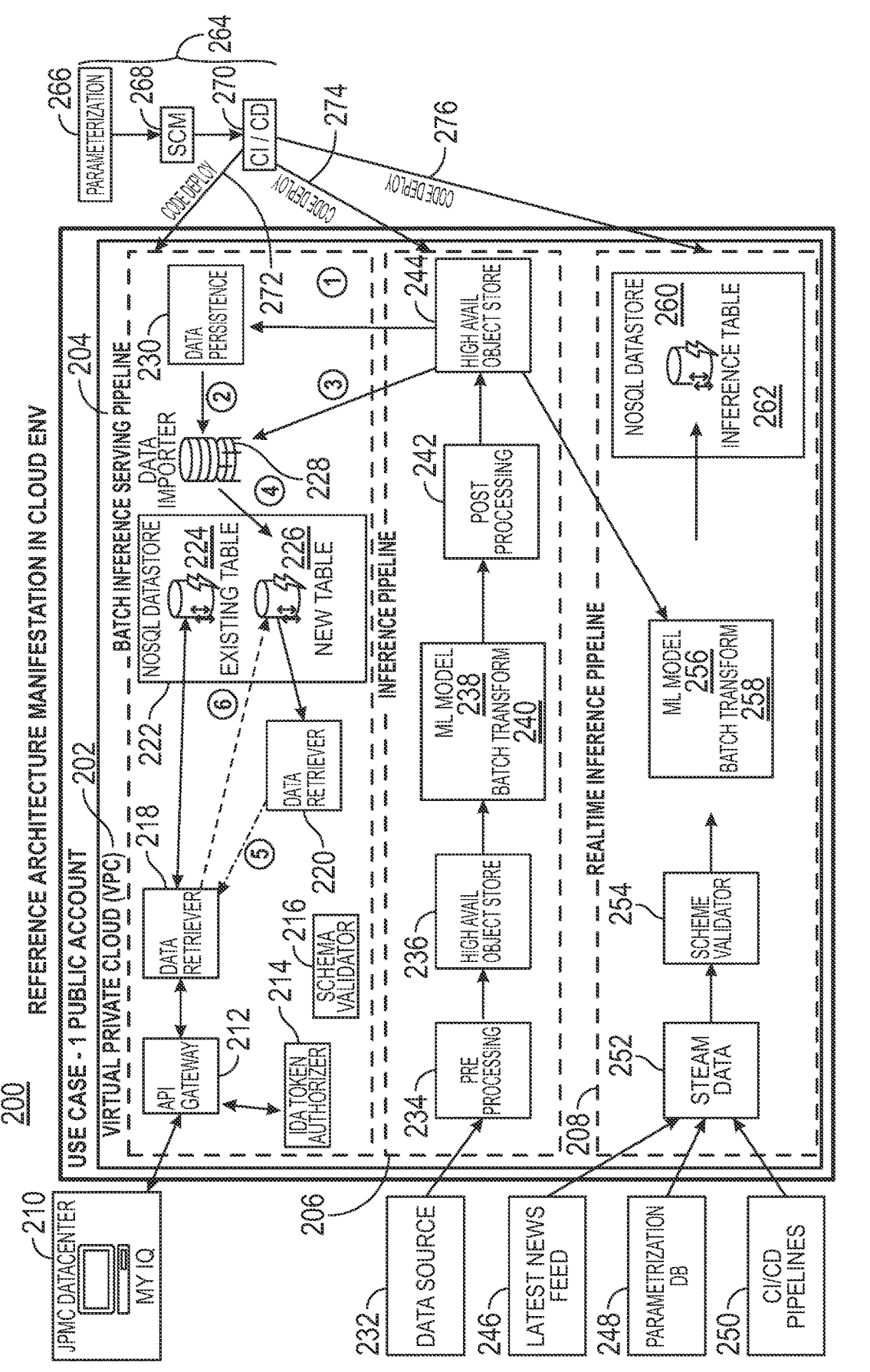
FIG. 2 is a schematic view of a modular ML pipeline architecture configured as a Lambda application implemented in a cloud computing environment, according to an exemplary embodiment.

FIG. 2 illustrates a schematic view of a modular ML pipeline architecture 200 configured as a Lambda application implemented in a cloud computing environment. The ML pipeline architecture 200 provides secure access using a cloud computing environment to enable one or more users or teams to build, train and deploy ML models for any use case. The cloud computing platform may include a third-party cloud computing platform, hosted in public or a private cloud.

Exemplary platforms include an AMAZON Web Services (AWS) cloud computing platform, a GOOGLE Cloud platform, and a MICROSOFT AZURE cloud computing platform that provide on-demand computer system resources via a networks such as the Internet. These cloud providers can provide isolated network domains, such as virtual private cloud (VPC) 202 which can be isolated or connected with other VPCs or datacenter networks using virtual routers.

In FIG. 2, the VPC 202 provides a logically isolated area of the cloud computing platform where the customer can launch resources in a virtual network that the customer defines. The underlying hardware (non-limiting examples: processors, hard drives, solid-state memory, random access memory (RAM), etc.) on which the components of the cloud environment execute can be shared by multiple customers or tenants as part of the shared computing resource environment.

The ML pipeline architecture 200 provides an ML pipeline as a service which having a no-code/low-code parameterized ML framework. The ML framework can be configured to be repeatable and reusable and can be applied to any application with no-code/low-code. The service application 200 further allows the software product to be deployed in a cloud agnostic and technology agnostic manner. The technology agnostic nature of the software product allows it to be generalized so that it may be deployed across a plurality of platforms simultaneously. The cloud agnostic nature of the software product ensures that it may be deployed in any cloud environment or cloud-based platforms. Being cloud agnostic, the software product may use corresponding cloud services and may take advantage of different features and services offered by different cloud-based platforms.

The ML pipeline architecture 200 encompasses a no-code/low-code parameterized ML framework, which can be configured to be modular and can be deployed independently. The pipeline 200 provides a modular arrangement of services that does not require a user to have pre-requisite knowledge of DevOps (Software Development and Operations) or MLOps (ML Operations) deployment components such as feature engineering, storing features in a feature store, model development, model evaluation, model deployment, batch and real time, and model monitoring.

FIG. 2 illustrates a reference architecture of the ML pipeline 200. The reference architecture provides recommended structures and integrations of information technology products and services to form a solution. The reference architecture may embody accepted industry best practices and suggest the optimal delivery method for specific technologies. In this context, the reference architecture is a generic architecture used as a foundation for the design of concrete architectures. The reference architecture provides a common vocabulary, reusable designs, and industry best practices that are used as a constraint for more concrete architectures. The reference architectures may include common architecture principles, patterns, building blocks, and standards.

The detailed view of FIG. 2 is merely an example configuration of an architecture of a modular ML pipeline 200 configured as a Lambda application and implemented in a cloud computing environment. The ML pipeline 200 provides an ML pipeline as a service and each component of the ML pipeline 200 can be a service. Thus, the modular ML pipeline 200 builds a solution as a service.

As illustrated in FIG. 2, Lambda application of the modular ML pipeline 200 may include a batch inference serving pipeline 204, inference pipeline 206, and real-time inference pipeline 208. Other configurations of ML pipeline 200 may be within the scope of the various embodiments described herein. Each pipeline 204, 206, 208 in the ML pipeline 200 is modular and can be deployed independently to expedite its implementation across multiple use cases. For example, when needed, changes can be implemented only on the inference pipeline 206 and the batch inference serving pipeline 204. The real-time inference pipeline 208 can remain unchanged.

In building the pipeline, the ML pipeline 200 can be built by combining the independent automation processes of layers 204, 206, 208 into a cohesive and unified system for effective and secure infrastructure. Each pipeline is vetted before the next pipeline is integrated into the ML pipeline 200 using a vetting procedure. Each and every step of the ML model artifact packaging and deployment pipeline is automatically monitored, relevant alerts are raised and notified in case of any anomalies. Also, post-deployment monitoring is enabled which can monitor the model's operation and correctness of the expected behavior. Several successful runs are tracked before publishing that deployment pattern as a blueprint.

As illustrated in FIG. 2, the interference pipeline 206 may include a pre-processing stage 234, a high availability object store 236, an ML model 238, a batch transform 240, a post processing stage 242, and a high availability object store 244. At the interference pipeline 206, the pre-processing stage 234 receives data from a data source 232. The data source 232 can gather data from various sources or from different servers located at different locations and interconnected via a network. The data source 232 can be configured to transfer the gathered data to the pre-processing stage 234, for example, periodically at a pre-determined time, such as daily.

The pre-processing stage 234 can perform the same or similar steps of pre-processing stages 104 of FIG. 1. In general, the pre-processing stage 234 entails collecting raw, unprocessed data. The pipeline transforms the raw data into useful information, which is in a format that can be understood. Data pre-processing 234 techniques can include, for example, feature engineering, feature extraction, and feature selection.

The features generated in the pre-processing stage 234 can be stored in a high availability object store 236. The high availability object store 236 is a database that is designed to operate with no interruptions in service, even if there are hardware outages or network problems. The high availability object store 236 ensures greater uptime by eliminating single points of failure, ensuring a reliable crossover between redundant systems, and detecting failures immediately. To keep high availability, the high availability object store 236 can include two swappable devices.

The features stored in the high availability object store 236 can be transferred as inputs to the ML model 238 used during training and testing the model and inference. The ML model 238 can perform the same or similar steps of the ML model 128 in FIG. 1. Batch transform 240 is configured to run predictions on large or small batch data to get inferences. Using the batch transform 240, prediction requests for a large number of data records can be handled and the data transformed quickly and easily.

Then, the data can be transferred to post-processing stage 242 for post-processing activities. The post-processing 242 occurs during the deployment phase of the ML model pipeline, after the model has been successfully trained. The post-processing stage 242 can perform the same or similar steps of the post-processing stage 130, 136 of FIG. 1. The data destination for the post-processing 242 can be a high availability object store 244, which stores the predictions.

In FIG. 2, the batch inference serving pipeline 204 may include an API Gateway 212, an IDA token authorizer 214, a schema validator 216, data retriever 218, 220, a nonstructured query language (NoSQL) 222 database, a data importer 228, and a data persistence 230. At the batch inference serving pipeline 204, at step 1, data importer 228 imports data from the high availability object store 244 of the inference pipeline 206 through a data persistence module 230 at step 2. Further, at step 3, the data importer 228 can be configured to receive data directly from the high availability object store 244 of the inference pipeline 206 and combine the data with the persisted data in the data importer 228.

The data persistence module 230 may ensure that the data is preserved. Data persistence is the longevity of data after the application that created it has been closed. For this to happen, the data must be written to non-volatile storage-a type of memory that can retain that information long-term, even if the application is no longer running. When data is persisted, it means that the exact same data can be retrieved by an application when it's reopened. The data remains the same, and nothing is lost in between sessions.

The data importer 228 can send the data into a new table 226 of NoSQL database 222 at step 4. NoSQL database 222 is a non-tabular database that enables the storage and querying of data differently than relational tables. In this example, NoSQL database 222 includes existing table 224 and new table 226.

The new table 226 can send the data to a data retriever 220 that may be configured as a data validator for validating the data. The data retriever 220 (data validator) can evaluate the received data and certify that it is appropriate for storage. If the data is deemed acceptable, then the data retriever 220 approves the data and forwards it to data retriever 218 at step 5. After the data is validated, at step 6, the data retriever 218 returns the data to be stored in the new table 226.

In FIG. 2 at the batch inference serving pipeline 204, an API Gateway 212 sits between datacenter 210 and services on the platform and provides centralized handling of API communication between the two. The API Gateway 212 can also be configured to deliver security and policy enforcement. The API Gateway 212 accepts API requests from a client such as datacenter 210, processes them based on defined policies, directs them to the appropriate services, and combines the responses for the user at datacenter 210. Typically, the API Gateway 212 handles a request by invoking multiple microservices and aggregating the results. For example, the API gateway 212 can use an IDA token authorizer 214 to control access. The IDA token authorizer 214 can be used to implement an authorization scheme that can use a bearer token authentication strategy or that can use request parameters to determine the user's identity (i.e., caller's identity). The schema validation 216 can be configured to execute a validation process of the data, where the data may be checked for invalidity.

Data retriever 218 interacts with the API gateway 212 and an existing table 224 of NoSql database 222 and retrieves data. The data retriever 218 retrieves the historical deployment metadata (e.g., historical data) associated with the previous source code version from the existing table 224. Data retriever 218 preferably processes data requests received from the API gateway 212 to search and retrieve data from existing table 244. Processing may include executing the data calls within the data request to search through the existing table 244, and then copying/retrieving any data that satisfies those data calls. Once data is retrieved, the data retriever 218 may send the data to the API gateway 212 for data dispatch to the datacenter 210.

In FIG. 2, the real-time inference pipeline 208 may include a stream data 252, a schema validator 254, an ML model 256, a batch transform 258, and a NoSQL database 260. At the real-time inference pipeline 208, real-time data coming from different sources, such as the latest data feed 246, a parameterization database 248, and CI/CD pipelines 250, can be loaded into a data stream 252. For example, many thousands of records may be fed into the data stream 252 per day. Then, a schema validator 254 can be configured to execute a validation process of the data, where the real-time data may be checked for invalidity.

The real-time data from the schema validator 254 can be transferred as inputs to the ML model 256 used during training and testing the model and inference. In addition, the prediction data from the high availability object store 244 of the inference pipeline 206 can be transferred to the ML model 256. The ML model 256 can perform the same (or similar) steps of ML model 128 depicted in FIG. 1. Batch transform 258 can be configured to run predictions on the real-time data to derive the inferences. Using the batch transform 258, prediction requests for a large number of data records can be handled and the data quickly and easily transformed. The data can then be stored in an inference table 262 of the NoSQL database 260.

In FIG. 2, a CI/CD pipeline 264 can be employed to improve the software code development and deployment. The CI/CD pipeline 264 can be configured as a continuous delivery service that automates code deployment into any integration point of the ML pipeline 200. The CI/CD pipeline 264 can help to handle the complexity of updating the system.

The CI/CD pipeline 264 may include a parameterization database 266, a SCM system 268, and a CI/CD tool 270. The CI/CD pipeline 264 can be built to perform the same or similar steps of CI/CD pipeline 140 depicted in FIG. 1. In general, the CI/CD pipeline 264 can automatically detect when the parameterized code changes are committed at the parameterization database 266. Then, the changes are built and tested at the SCM 268. After the tests are successfully completed, the CI/CD tool 270 automatically introduces the new code into the appropriate pipelines 204, 206, and 208.

Similar to the pipelines 204, 206, and 208, the CI/CD pipeline 264 can be a modular component and deployed independently. The CI/CD pipeline 264 can be deployed such that it is integrated independently either simultaneously or concurrently into each of the respective pipelines 204, 206, and 208. For example, code deploy 272 can integrate the new code into the batch inference serving pipeline 204. Code deploy 274 can integrate the new code into the inference pipeline 206. Code deploy 276 can integrate the new code into the real-time inference pipeline 208.

When the ML pipeline 200 is deployed for a different use case or if a change occurs with one or more parameters, the source code using the CI/CD pipeline 264 can be updated or changed to provide a solution, while the ML pipeline remains unchanged. Thus, the same ML pipeline 200 can be configured for various use cases by merely changing the source code using the CI/CD pipeline 264. This flexibility enables the same ML pipeline 200 to be used for various use cases. The same ML pipeline 200 can be used to easily and rapidly release new features. In contrast to conventional systems that may require multiple deployments, the ML pipeline 200 can use a single deployment to deploy the ML model. The system according to the present disclosure can eliminate multiple separate deployments, reduce overhead, and help to avoid downtime during deployment.

Figure 3:
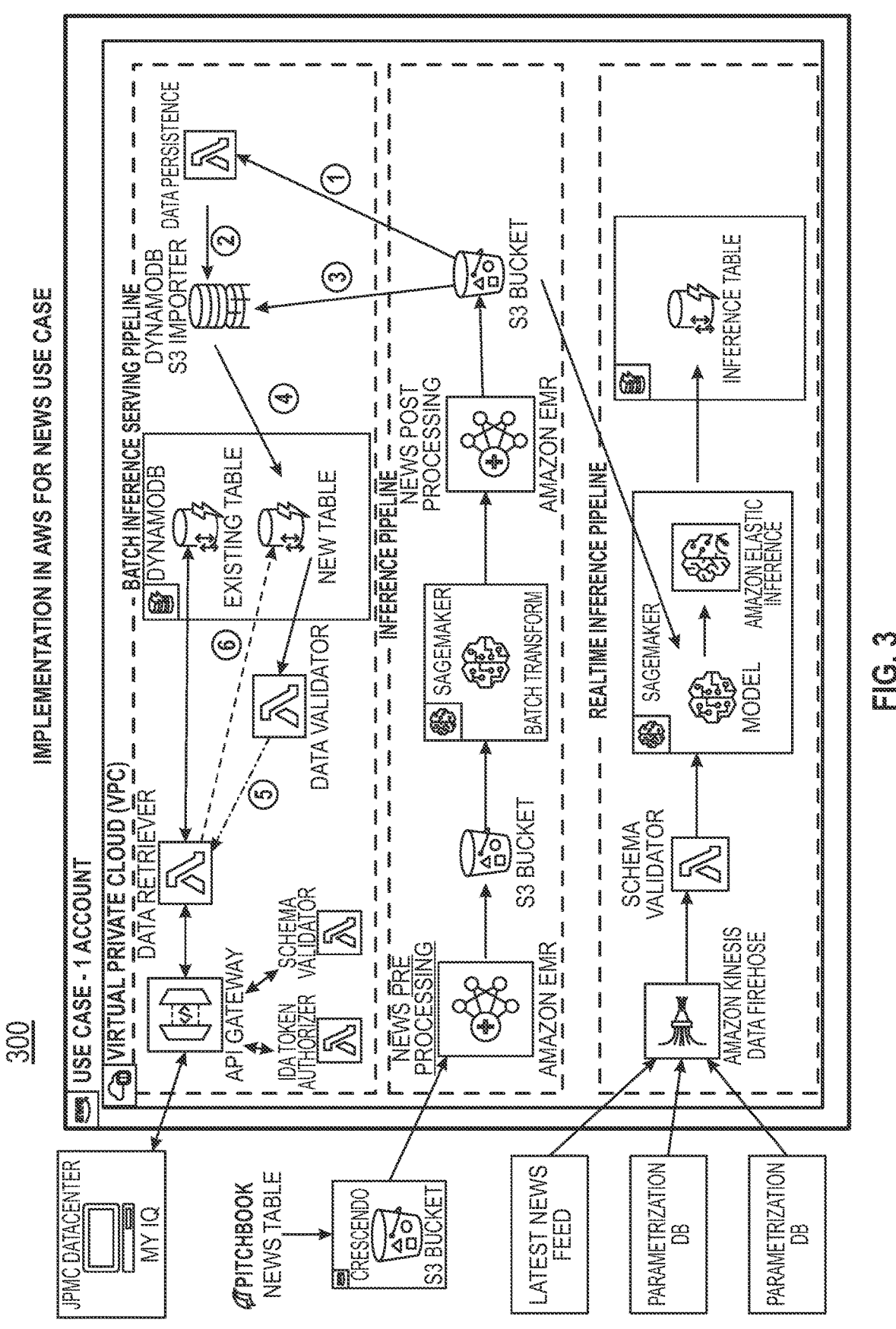
FIG. 3 is a schematic view of a modular ML pipeline for a use case implemented in a cloud computing environment, according to an exemplary embodiment.
Figure 4:
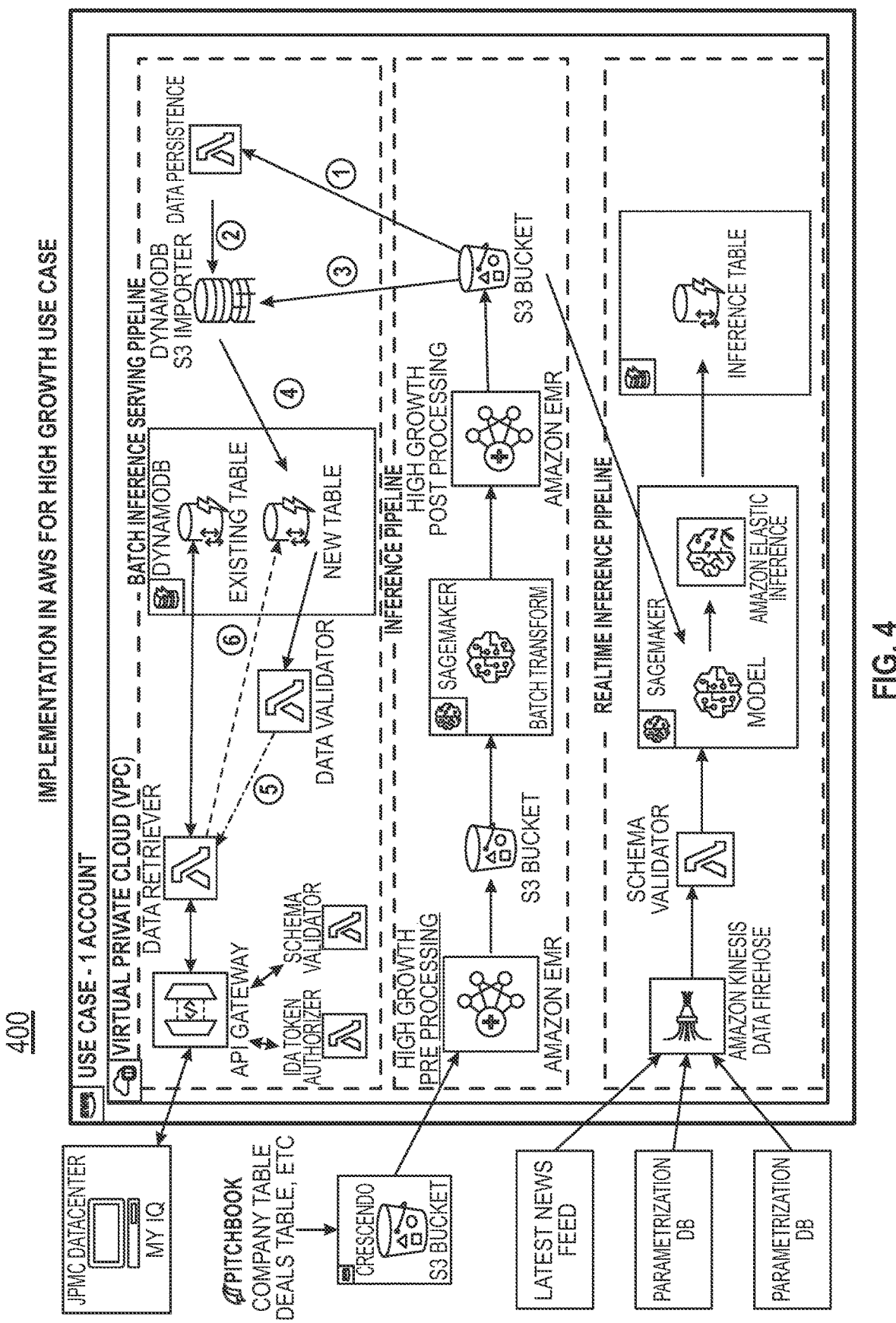
FIG. 4 is a schematic view of a modular ML pipeline for another use case implemented in a cloud computing environment, according to an exemplary embodiment.

There are many use cases that can be simplified by the approach disclosed in FIGS. 1-2. Based on the template of the reference architecture depicted in FIG. 2, the same pipeline can be applied across various use cases. In one example, as shown in FIG. 3, the use case may be a News use case 300 implemented in a serverless computing platform environment (SCPE). By merely changing the source code in the CI/CD pipeline 264 and deploying the new source code, the same pipeline can be used in another example, as illustrated in FIG. 4 where the use case is a High Growth use case 400 implemented in SCPE. Various embodiments have leveraged one of the industry standard CI/CD build and deploy platforms. However, the architecture of the present disclosure is agnostic to CI/CD platforms and can be implemented perfectly well with any other CI/CD platform which provides artifact containerization and deployment capabilities.

In FIGS. 3-4, the example embodiments may employ cloud based serverless computing to create the infrastructure disclosed herein. If a platform is developed using a similar type of serverless architecture, the components of the platform may be analogous to the embodiments herein.

FIG. 5 is a flowchart of an exemplary method 500 for developing and deploying an ML pipeline. Although the blocks in FIG. 5 are shown in an order, the blocks of FIG. 5 may be performed in any order and are not limited to the order shown in FIG. 5. Additionally, some blocks may be optional, may be performed multiple times, and/or may be performed by different components.

In block 510, different types of data can be collected from different data sources. The different types of data may include batch data or periodic data collected at predetermined intervals and/or real-time data.

In block 520, the different types of data can be continuously processed using a reference module having a Lambda Architecture deployed as a service application in a cloud agnostic manner, as shown for example in FIG. 2. The reference module provides a template so that the same ML pipeline can be applied across various use cases.

In block 530, one or more modular layers of a Lambda application can be built by executing Lambda functions on the collected data. Each layer can be deployed independently. The modular layers can include a batch inference serving layer, an inference layer, and a real-time inference layer. In block 540, a CI/CD pipeline can be built to deploy the code independently.

In block 550, a No-Code/Low-Code parameterized ML pipeline framework can be built wherein each component is modular. Each layer is sequentially vetted and integrated into the ML pipeline before the next layer is vetted and integrated into the ML pipeline. Building the ML pipeline does not require that the user has knowledge of software development and operations or ML operations. In block 560, the CI/CD pipeline can be integrated into the ML Pipeline.

In block 570, the ML pipeline can be deployed for a first use case. In block 580, the same ML pipeline can be used for a different use case by only revising the code, committing the code changes, and automatically deploying the updated code using the CI/CD pipeline. At the same time, the ML pipeline framework remains unchanged. The CI/CD pipeline can deploy the new code at one or more specific layers.

Figure 6:
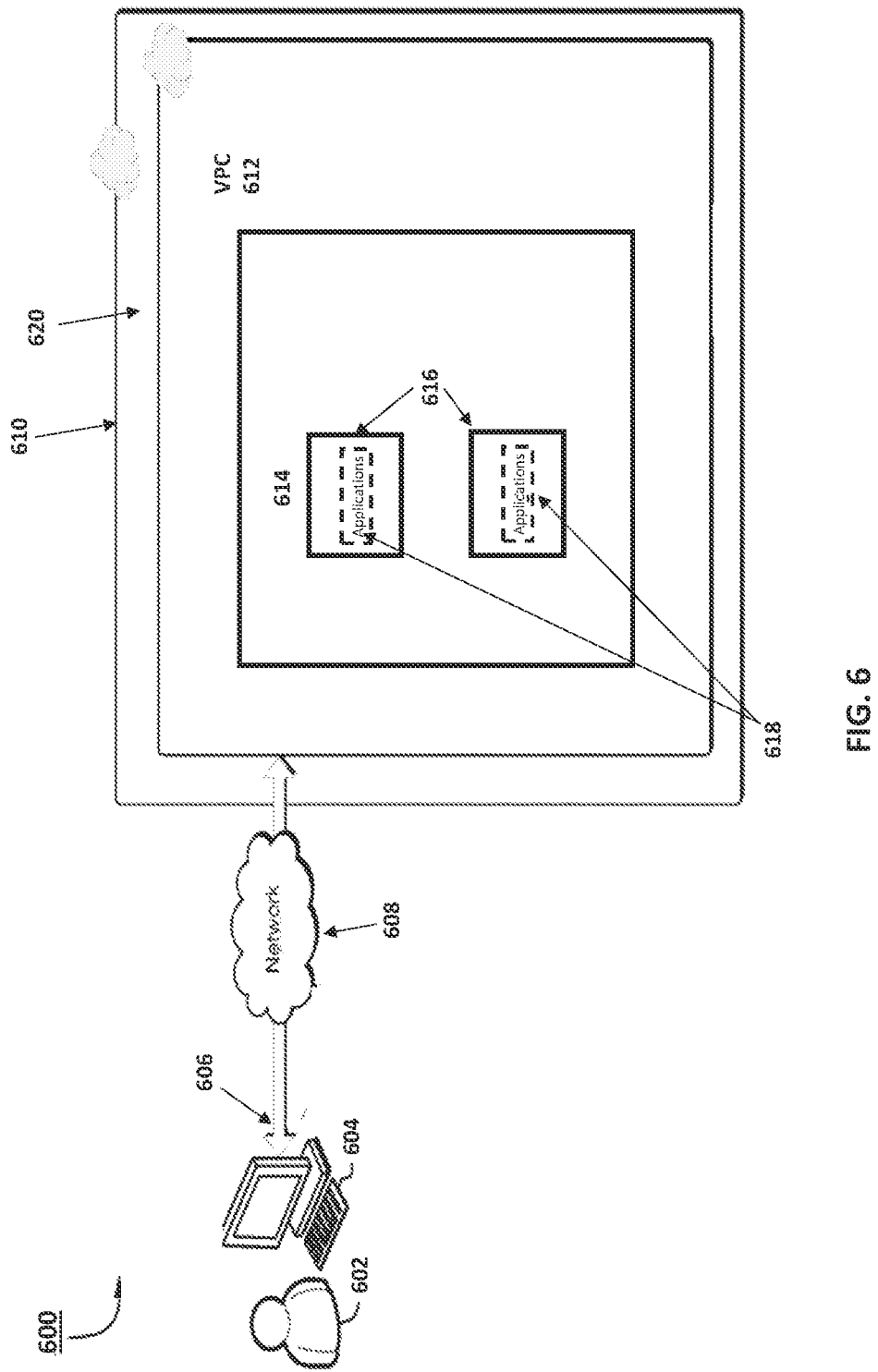
FIG. 6 is an exemplary diagram of a system that is usable for implementing a method for developing and deploying a modular ML pipeline in an cloud environment, according to an exemplary embodiment.

FIG. 6 illustrates implementing the system and method as described in FIGS. 1-5 in a cloud computing environment 600. The cloud environment 600 can be hosted in a public or private cloud. These cloud providers can provide isolated network domains (for example virtual private cloud 612) that can be isolated or connected with other VPCs or datacenter networks using virtual routers. The VPC 612 provides a logically isolated area of the cloud environment where the customer can launch resources in a virtual network that the customer defines.

In the example environment 600 illustrated in FIG. 6, a user 602 may use a communication device 604 to connect 606 to a variety of services provided by a cloud service provider 610. The user 602 may use the communication device 604 to connect 606 to the cloud service provider 610 over a network 608 such as, for example, the Internet. The cloud service provider 610 may provide a distributed, virtualized, and/or datacenter environment within which one or more applications, processes, services, virtual machines, and/or other such computer system entities may be executed. The user 602 may be a person, a process running on one or more remote computer systems, or some other computer system entity, user, or process.

In some embodiments, the communication device(s) 604 may take the form of servers, general purpose computers, mainframe computers, or the like. In other embodiments, the communication devices may take the form of mobile computing devices such as smartphones, tablets, laptop computers or the like. Alternatively, the communication devices may be configured as particular apparatus, embedded systems, dedicated circuits, or the like, based on the storage, execution, and/or implementation of the software instructions that perform operations consistent with the disclosed embodiments.

Commands from the user 602 to the cloud service provider 610 may originate from an outside computer system or from within the cloud environment. The commands to connect 606 to the cloud service provider 610 may be sent to the cloud service provider 610 and/or the services operating in the environment therein, without the direct intervention of the user 602 (i.e., commands to connect 606 to the cloud service provider 610 may be generated automatically in response to one or more events). The user 602 may be a privileged user associated with a customer of the cloud service provider 610. The user 602 may also be a privileged user associated with the cloud service provider 610.

The cloud service provider 610 may provide access to one or more host machines, may provide access to one or more virtual machine instances as may be operating thereon, or may provide access to one or more services in an environment therein. The one or more services provided by the cloud service provider 610 may also be implemented as and/or may utilize one or more virtual machine instances as may be operating on host machines operating within the cloud service provider 610 environment.

For example, the cloud service provider 610 may provide a variety of services to users including, but not limited to, the user 602 and the users may communicate with the cloud service provider 610 via an interface such as a web services interface or any other type of interface. While the example environment illustrated in FIG. 6 shows a single connection or interface to the cloud service provider 610, each of the services operating in an environment therein may have its own interface and, generally, subsets of the services may have corresponding interfaces in addition to or as an alternative to the single interface.

FIG. 6 illustrates a container application implemented in the cloud computing environment 600 according to various exemplary embodiments of the present teachings. The underlying hardware (e.g., processors, hard drives, solid-state memory, random access memory (RAM), etc.) on which the components of the external unmanaged cloud environment 116 execute can be shared by multiple customers or tenants as part of the shared computing resource environment. In addition, when implemented in a shared computing resource environment as a cloud-based service 620, various components can be implemented using containerization or operating-system-level virtualization, or other virtualization technique. For example, one or more components can be implemented as separate software containers or container instances.

In an example of a type of service operating within the environment of the cloud service provider 610, a virtual computer system service may be a collection of computing resources configured to instantiate virtual machine instances on behalf of a customer such as the user 602. The user may interact with a virtual computer system service (via appropriately configured and authenticated API requests) to provision and operate virtual machine instances that are instantiated on physical computing devices hosted and operated by the cloud resource service provider 610. The virtual computer system service may provision the instance by instantiating the instance, configuring the instance, and providing resources to run the instance.

The virtual computer system service may also be configured to manage virtual machine instances to, for example, instantiate virtual machine instances and/or to manage the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

These software containers, also referred to simply as containers 616, are lightweight, virtualized execution environments for applications that package an application 618 in its own complete file system. The file system contains everything the application 618 needs to run, including one or more programs, data, application code, and any application dependencies (e.g., libraries, files, etc.). Application dependencies include the source code package the application code relies on, a language runtime for interpreted languages, and binary packages that the dynamically linked code relies on.

When one of the containers 616 is run (or executed), the running program (i.e., the process) is isolated from other processes running in the same computer system instance. Thus, the containers 616 may each run on an operating system (e.g., using memory, CPU, and storage allocated by the operating system) of the container instance 614 and execute in isolation from each other. For example, each container may have an isolated view of the file system of the operating system.

Figure 7:
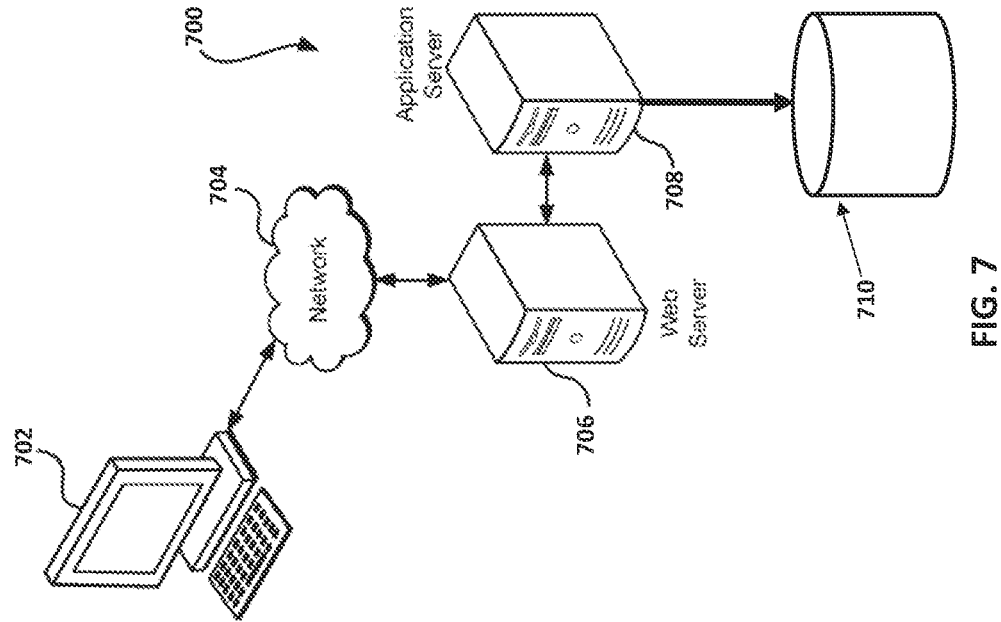
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic device 702, which can include any appropriate device operable to send and/or receive requests, messages, or information over an appropriate network 704. In some embodiments, an appropriate device may convey information back to a user of the device. Examples of such electronic devices 702 include personal computers, cell phones, handheld messaging devices, laptop computers, tablet computers, set-top boxes, personal data assistants, embedded computer systems, electronic book readers, and the like.

The network 704 can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail.

Communication over the network can be enabled by wired or wireless connections and combinations thereof. In this example, the network 704 includes the Internet and/or other publicly addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes, or components, that may be chained or otherwise configured, that can interact to perform tasks such as obtaining data from an appropriate data store.

Servers, as used herein, may be implemented in various ways, such as hardware devices or virtual computer systems. In some contexts, servers may refer to a programming module being executed on a computer system. As used herein, unless otherwise stated or clear from context, the term "datastore" or "data store" refers to any device or combination of devices capable of storing, accessing, and retrieving data, which may include any combination and number of data servers, databases, data storage devices, and data storage media, in any standard, distributed, virtual, or clustered environment.

The application server 708 can include any appropriate hardware/software/firmware for integrating with the data store 710 needed to execute aspects of applications for the electronic device 702, handling some or all of the data access and logic for an application. The application server 708 may provide access control services in cooperation with the data store 710. It can also generate content including, but not limited to, text, graphics, audio, video, and/or other content usable to be provided to the user. Such content may be served to the user by the web server in the form of Hypertext Markup Language ("HTML"), Extensible Markup Language ("XML"), JavaScript, Cascading Style Sheets ("CSS"), JavaScript Object Notation (JSON), and/or another appropriate client-side structured language.

Content transferred to an electronic device 702 may be processed by the electronic device 702 to provide the content in one or more forms including, but not limited to, forms that are perceptible to the user audibly, visually, and/or through other senses. The handling of all requests and responses, as well as the delivery of content between the electronic device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system illustrated in the example environment 700 in FIG. 7 should be taken as being illustrative in nature and not limiting to the scope of the disclosure.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method for developing and deploying a machine learning pipeline, the method comprising:

collecting different types of data, by at least one processor, from one or more data sources, wherein the different types of data include batch data and real-time data;

continuously processing, by at least one processor, the different types of data to build a plurality of layers of a Lambda application, wherein each layer is configured to be deployed independently of the other layers;

building, by the at least one processor, a modular machine learning pipeline in a modifiable reference file, wherein the modular machine learning pipeline defines a framework comprising a no-code/low-code parameterized machine learning framework;

building and integrating, by the at least one processor, a CI/CD (Continuous Integration and Continuous Delivery/Continuous Deployment) pipeline to deploy a source code into the modular machine learning pipeline;

deploying, by the at least one processor, the modular machine learning pipeline as a single deployment machine learning pipeline for different use cases by revising the source code of the CI/CD pipeline, while the framework of the single deployment machine learning pipeline remains unchanged;

wherein the plurality of layers are different from each other, and one of the plurality of layers is configured as a prediction-generating layer to generate, based on the different types of data, prediction data that are imported, unidirectionally and independently without modifying the prediction data, to at least two different layers of the plurality of layers, and wherein the at least two different layers of the plurality of layers include a batch inference layer and a real-time inference layer configured to operate asynchronously with respect to the prediction-generating layer; and wherein the CI/CD pipeline is configured to build and test the source code before deploying the source code directly into at least one of the plurality of layers based on the source code, the CI/CD pipeline is configured to be integrated independently into each of the respective plurality of layers, and the CI/CD pipeline is configured to continuously and automatically introduce the source code into any stage of the respective plurality of layers that the CI/CD pipeline determines is an appropriate layer to receive the source code based on new changes to the source code; and wherein the CI/CD pipeline is configured to identify an error condition in the modular machine learning pipeline, ensure a continuous flow of new features by introducing the source code into any stage of the respective plurality of layers to correct the error condition in the modular machine learning pipeline.

2. The method of claim 1, wherein each component of the framework comprises modular components configured to be deployed independently.

3. The method of claim 1, wherein the prediction-generating layer is an inference layer.

4. The method of claim 3, wherein building the modular machine pipeline further comprises sequentially vetting and integrating a first layer of the plurality of layers into the modular machine learning pipeline before the next layer is vetted and integrated into the modular machine learning pipeline.

5. The method of claim 1, wherein building the modular machine pipeline further comprises building an end-to-end pipeline including a data pre-processing stage, a model training stage, a model evaluation stage, and a model deployment stage.

6. The method of claim 5, wherein the data pre-processing stage comprises:

collecting the different types of data as raw data; and implementing feature engineering, feature extraction, and feature selection to select and transform the raw data to features;

wherein the features being configured to build one or more machine learning models.

7. The method of claim 6, further comprising storing the features in a feature store.

8. The method of claim 6, wherein the model training stage comprises receiving the features to train and test the one or more machine learning models.

9. The method of claim 8, wherein the model evaluation stage comprises using historical data to evaluate a performance of the one or more machine learning models and to identify a best performing model based on the evaluated performance.

10. The method of claim 9, wherein the model deployment stage comprises deploying the best performing model for operation within a production environment such that the best performing model is configured to make predictions based on production environment data obtained from the production environment while operating the best performing model within the production environment.

11. The method of claim 10, wherein the model deployment stage comprises a cloud based deployment to a cloud environment.

12. The method of claim 11, wherein the cloud environment includes a Virtual Private Cloud (VPC) and one or more containers; and wherein the VPC is hosting the one or more containers, and the one or more containers are running one or more applications.

13. The method of claim 1, wherein the CI/CD pipeline is configured to create parameterized code.

14. The method of claim 1, further comprises monitoring, by the at least one processor, the single deployment machine learning pipeline for degradation caused by drift.

15. The method of claim 1, further comprising receiving via a user device an input from a user having no knowledge of software development and operations or machine learning operations, wherein the input being configured to build the no-code/low-code parameterized machine learning framework.

16. A system for developing and deploying a machine learning pipeline, the system comprising:

a receiving module, that when executed by at least one processor, is configured to collect different types of data from one or more data sources, wherein the different types of data include batch data and real-time data;

a reference module, that when executed by the at least one processor, is configured to continuously process the different types of data to build a modular machine learning pipeline including a plurality of module layers of a Lambda application, wherein each layer is configured to be deployed independently of the other layers and the reference module is built by combining the plurality of module layers, independently, wherein the plurality of layers comprises a batch layer, a real-time layer and an inference layer;

a CI/CD pipeline module, that when executed by the at least one processor, is configured to deploy a source code into the modular machine learning pipeline, independently;

wherein the reference module, that when executed by the at least one processor, is configured to be deployed as a single deployment machine learning pipeline for different use cases by revising the source code of a CI/CD pipeline, while a framework of the single deployment machine learning pipeline remains unchanged;

wherein the plurality of layers are different from each other, and one of the plurality of layers is configured as a prediction-generating layer to generate, based on the different types of data without modifying the prediction data, prediction data that are imported, unidirectionally and independently, to at least two different layers of the plurality of layers, wherein the at least two different layers of the plurality of layers include the batch inference layer and the real-time inference layer configured to operate asynchronously with respect to the prediction-generating layer; and wherein the CI/CD pipeline is configured to build and test the source code before deploying the source code directly into at least one of the plurality of layers based on the source code, the CI/CD pipeline is configured to be integrated independently into each of the respective plurality of layers, and the CI/CD pipeline is configured to continuously and automatically introduce the source code into any stage of the respective plurality of layers that the CI/CD pipeline determines is an appropriate layer to receive the source code based on new changes to the source code; and wherein the CI/CD pipeline is configured to identify an error condition in the modular machine learning pipeline, ensure a continuous flow of new features by introducing the source code into any stage of the respective plurality of layers to correct the error condition in the modular machine learning pipeline.

17. The system of claim 16, wherein the framework is configured having a no-code/low-code parameterized machine learning framework; and a CI/CD pipeline module, that when executed by at least one processor, is configured to deploy a source code into the single deployment machine learning pipeline.

18. The system of claim 16, wherein the reference module is configured to be built by sequentially vetting and integrating a first layer of the plurality of layers into the modular machine learning pipeline before the next layer is vetted and integrated into the modular machine learning pipeline.

19. The system of claim 16, wherein the reference module is configured to be deployed in a cloud environment in a cloud agnostic and technology agnostic manner.

20. A tangible computer-readable medium having stored thereon, computer executable instructions that, if executed by a computing device, cause the computing device to perform a method for developing and deploying a machine learning pipeline, the method comprising:

collect different types of data, by at least one processor, from one or more data sources, wherein the different types of data include batch data and real-time data;

continuously process, by at least one processor, the different types of data to build a plurality of layers of a Lambda application, wherein each layer is configured to be deployed independently of the other layers;

build, by the at least one processor, a modular machine learning pipeline in a modifiable reference file, wherein the modular machine learning pipeline defines a framework comprising a no-code/low-code parameterized machine learning framework;

build and integrate, by the at least one processor, a CI/CD pipeline to deploy a source code into the modular machine learning pipeline;

deploy, by the at least one processor, the modular machine learning pipeline as a single deployment machine learning pipeline for different use cases by revising the source code of the CI/CD pipeline, while the framework of the single deployment machine learning pipeline remains unchanged;

wherein the plurality of layers are different from each other, and one of the plurality of layers is configured as a prediction-generating layer to generate, based on the different types of data, prediction data that are imported, unidirectionally and independently without modifying the prediction data, to at least two different layers of the plurality of layers, and wherein the at least two different layers of the plurality of layers include a batch inference layer and a real-time inference layer configured to operate asynchronously with respect to the prediction-generating layer; and wherein the CI/CD pipeline is configured to build and test the source code before deploying the source code directly into at least one of the plurality of layers based on the source code, the CI/CD pipeline is configured to be integrated independently into each of the respective plurality of layers, and the CI/CD pipeline is configured to continuously and automatically introduce the source code into any stage of the respective plurality of layers that the CI/CD pipeline determines is an appropriate layer to receive the source code based on new changes to the source code; and wherein the CI/CD pipeline is configured to identify an error condition in the modular machine learning pipeline, ensure a continuous flow of new features by introducing the source code into any stage of the respective plurality of layers to correct the error condition in the modular machine learning pipeline.

\* \* \* \* \*